United States Patent
Tsubura

(10) Patent No.: US 7,854,517 B2
(45) Date of Patent: Dec. 21, 2010

(54) PROJECTOR SYSTEM HAVING COOLING FAN

(75) Inventor: Toshiyasu Tsubura, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 1018 days.

(21) Appl. No.: 11/601,112

(22) Filed: Nov. 17, 2006

(65) Prior Publication Data

US 2007/0115438 A1 May 24, 2007

(30) Foreign Application Priority Data

Nov. 22, 2005 (JP) ............................. 2005-336766

(51) Int. Cl.
G03B 21/16 (2006.01)
G03B 21/18 (2006.01)
G03B 21/26 (2006.01)

(52) U.S. Cl. .................. 353/52; 353/55; 353/57; 353/60; 353/61

(58) Field of Classification Search ............... 353/52, 353/55–58, 60–61, 122
See application file for complete search history.

(56) References Cited

U.S. PATENT DOCUMENTS

| | | | |
|---|---|---|---|
| 5,313,234 A * | 5/1994 | Edmonson et al. | 353/61 |
| 5,738,427 A * | 4/1998 | Booth et al. | 353/57 |
| 6,238,050 B1 * | 5/2001 | Konuma et al. | 353/57 |
| 6,641,267 B2 * | 11/2003 | Ohishi et al. | 353/61 |
| 6,824,272 B2 * | 11/2004 | Hsu et al. | 353/61 |
| 6,832,837 B2 * | 12/2004 | Suzuki et al. | 353/61 |
| 7,086,740 B2 * | 8/2006 | Sample et al. | 353/52 |
| 7,217,011 B2 * | 5/2007 | Wang et al. | 362/345 |
| 7,510,285 B2 * | 3/2009 | Takemi et al. | 353/61 |
| 2004/0246447 A1 * | 12/2004 | Shiraishi | 353/58 |
| 2005/0030484 A1 * | 2/2005 | Kuroda | 353/57 |
| 2005/0073658 A1 | 4/2005 | Chang et al. | |

(Continued)

FOREIGN PATENT DOCUMENTS

JP 2001-75176 A 3/2001

(Continued)

OTHER PUBLICATIONS

Chinese Office Action dated Apr. 3, 2009 (7 pages), and English translation thereof (6 pages), issued in counterpart Chinese Application Serial No. 200680019161.9.

(Continued)

Primary Examiner—Tony Ko
Assistant Examiner—Jori S Reilly-Diakun
(74) Attorney, Agent, or Firm—Holtz, Holtz, Goodman & Chick, PC

(57) ABSTRACT

A projector includes a light source unit, a light source side optical system, a display device for producing a projected image to be projected, a projection side optical system for projecting the projected image produced by the display device, a blower acting as a cooling fan for cooling the light source unit, an exhaust air temperature reducing unit for reducing the temperature of highly heated air which results from the cooling of the light source unit by the cooling fan, and exhaust vents for expelling exhaust air from the exhaust air temperature reducing unit to the outside. The exhaust air temperature reducing unit is made up of a heat pipe and fins.

11 Claims, 10 Drawing Sheets

U.S. PATENT DOCUMENTS

2005/0264766 A1* 12/2005 Morimoto et al. ............. 353/61
2008/0018863 A1* 1/2008 Hsiao ......................... 353/54

FOREIGN PATENT DOCUMENTS

| JP | 2001-312002 A | 11/2001 |
|---|---|---|
| JP | 2004-219752 A | 8/2004 |
| JP | 2005-10693 A | 1/2005 |
| JP | 2005-275150 A | 10/2005 |
| JP | 2005-321525 A | 11/2005 |

OTHER PUBLICATIONS

Japanese Office Action dated Apr. 13, 2009 (3 pages), and English translation thereof (3 pages), issued in counterpart Japanese Application Serial No. 2005-336766.

Japanese Office Action dated Jan. 29, 2009 (2 pages), and English translation thereof (2 pages) issued in counterpart Japanese Application No. 2005-336766.

Japanese Office Action (and English translation thereof) dated Aug. 21, 2008, issued in a counterpart Japanese Application.

* cited by examiner

PROJECTOR SYSTEM HAVING COOLING FAN

BACKGROUND OF THE INVENTION

1. Field of the Invention

The present invention relates to a data projector for projecting an image or an electrical appliance which needs to expel heated air therefrom.

2. Description of the Related Art

In recent years, data projectors are used much as image projectors for projecting a screen of a personal computer and a video image, and furthermore, an image formed by image data stored in a memory card or the like on to a screen.

The data projector incorporates therein a small, high-luminance light source such as a metal halide lamp or an extra-high voltage mercury lamp and is configured such that a light from the light source is sequentially divided into red light, green light and blue light using a red filter, a green filter and a blue filter, which are each then concentrated on to a micromirror display device designated as a liquid crystal display device or a DMD (Digital Micromirror Device) by a lens, whereby a color image is displayed on a screen by the red, green and blue light when each light is transmitted or reflected in a certain amount towards a projection opening of the projector system by the display device.

The micromirror display device is such that microscopic mirror cells are tilted independently of others by a control signal so as to control directions of light that is reflected independently by the microscopic mirror cells so tilted in such a way that light that is made to be incident on the display device by an illuminating side optical system is divided into on-state light which is reflected by the microscopic mirror cells which are in "on" position so as to be directed towards a projection lens which makes up a projection side optical system and off-state light which is reflected by the microscopic mirror cells which are in "off" position so as to be directed towards a light absorber plate. This operation is carried out in each of micromirror display devices for red, green and blue light, and times during which the mirror cells for red light, green light and blue light are switched to the "on" position to produce on-state light are controlled so as to project a color image on to the screen.

In the data projector that is configured as has been described above, since the metal halide lamp or the extra-high voltage lamp which makes up the light source is heated to a high temperature, they need to be cooled. In Japanese Patent Unexamined Publication No. 2001-312002, a technique is proposed in which air is circulated within an optical unit of a projector using a heat pipe and a cooling fan so as to reduce the temperature of the light source. In the case where air is circulated in the interior of the optical unit like this, however, there has existed an inherent problem that when the lamp is kept on for a long period of time, the temperature inside the optical unit is increased.

In addition, there have proposed many techniques in which outside air is taken in to cool a light source. However, the light source is heated to a temperature of several hundreds degrees or near a thousand degrees, and in order to mix the exhaust air which has been heated to a high temperature as a result of cooling the light source that has been heated to the high temperature with outside air, in many cases, the heat source has to be kept away a certain distance, and to make this happen, the thickness of a housing has had to be increased or the size of the housing has had to be increased. In addition, there have been caused a defect that the highly heated exhaust air heats up exhaust vents and the vicinity thereof or wobbles a projected image in front of the projection lens.

SUMMARY OF THE INVENTION

According to a preferred aspect of the invention, there is provided a projector including:

a light source unit;

a light source side optical system;

a display device for projecting a projection image;

a projection side optical system for projecting a projection image;

a cooling fan for cooling the light source unit;

an exhaust air temperature reducing unit for reducing the temperature of highly heated air which is produced as a result of the cooling of the light source unit by the cooling fan; and a vent hole for expelling exhaust air which has passed through the exhaust air temperature reducing unit to the outside.

In addition, according to another preferred aspect of the invention, there is provided an electrical appliance including:

a housing which has provided therein a primary heat source, a secondary heat source having a smaller heat value than that of the primary heat source and a cooling fan for cooling the primary heat source and the secondary heat source;

an exhaust air temperature reducing unit for reducing the temperature of highly heated air which is produced as a result of the cooling of the primary heat source by the cooling fan; and a plurality of exhaust vents for expelling exhaust air which has passed through the exhaust air temperature reducing unit to the outside.

Furthermore, according to a further preferred aspect of the invention, there is provided a projector including:

a housing which has provided therein a light source, a power supply circuit having a smaller heat value than that of the primary heat source and a cooling fan for cooling the primary heat source and the power supply circuit;

a plurality of exhaust vents through which exhaust air is expelled to the outside by the cooling fan; and an exhaust air temperature equalizing unit for equalizing the temperature of exhaust air at the plurality of exhaust vents.

According to the invention, a projector system can be provided which exhibits a good heat dissipation.

DETAILED DESCRIPTION OF THE PREFERRED EMBODIMENT

Mode for Carrying out the Invention

Figure 1:
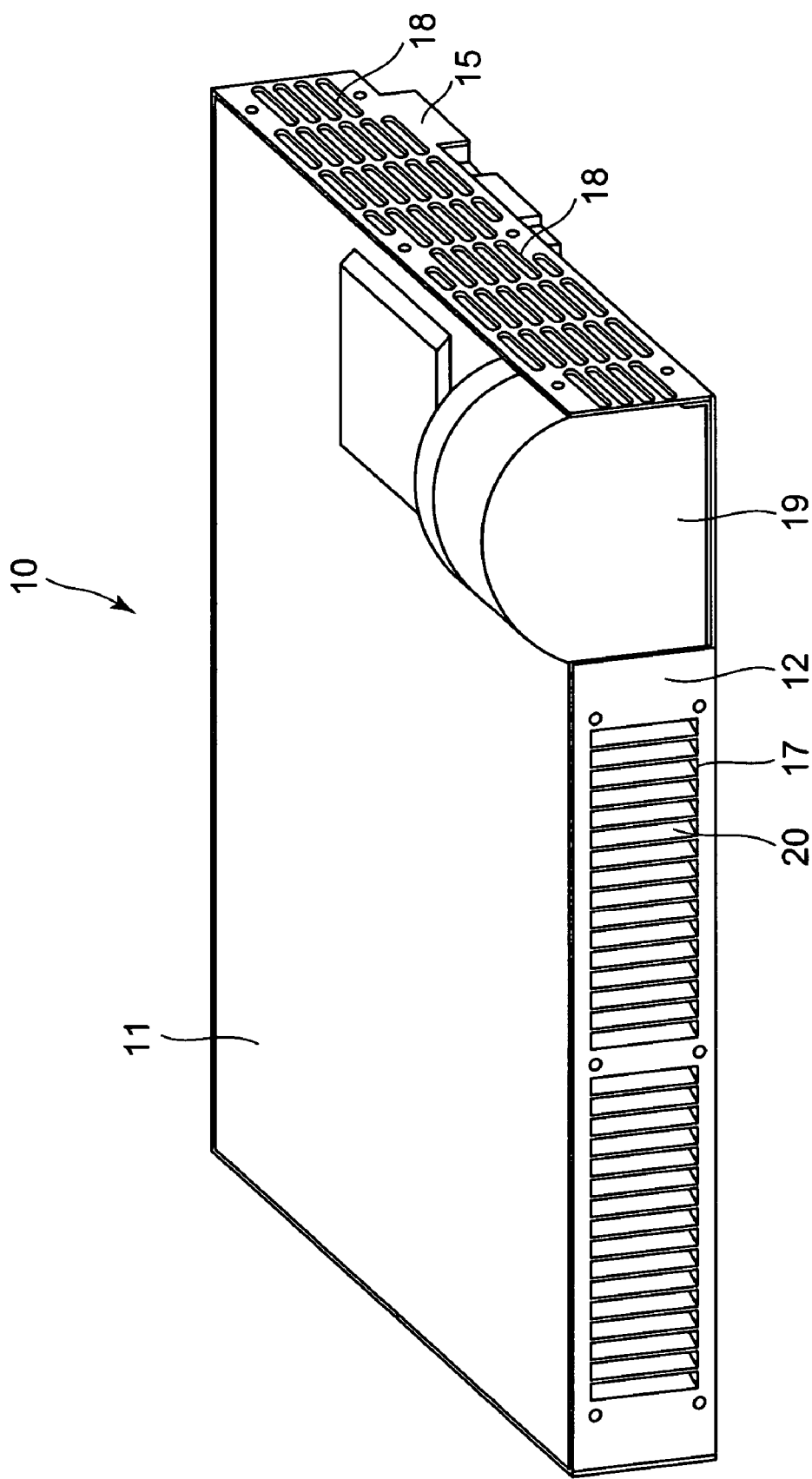
[FIG. 1] A diagram showing an external appearance of a data projector according to an embodiment of the invention.

A projector 10 according to a best mode for carrying out the invention is formed into substantially a rectangular parallelepiped and includes a light source unit 63, a light source side optical system 61 for transmitting light of the light source unit 63, a display device 51 for producing an image by receiving light from the light source side optical system 61, a projection side optical system 62 for projecting the image produced by the display device 51, a blower 110 which is a cooling fan for cooling the light source unit 63, an exhaust air temperature reducing unit 114 for reducing the temperature of highly heated exhaust air produced as a result of the cooling of the light source unit 63 by the cooling fan, and exhaust vents 17 having louvers 20 which are provided in a front plate 12 for expelling exhaust air which has passed through the exhaust air temperature reducing unit 114 to the outside.

In addition, the light source unit 63 and the exhaust air temperature reducing unit 114 are accommodated in a light source compartment 120, and the light source compartment 120 is configured such that the compartment is separated from other compartments within the projector by a first bulkhead 121, a second bulkhead 122, a third bulkhead 123 and a fourth bulkhead 124 which are each formed into a wall element, the front plate 12 is provided at the front thereof, and a compartment cover 125 is placed to cover the light source compartment 120 from thereabove. In addition, an air outlet port 113 of the blower 110 is connected to the light source compartment 120 at a portion lying between the first bulkhead 121 and the second bulkhead 122, and the light source compartment 120 is made to have a hermetic construction in other locations therein than the air outlet port 113 and the exhaust vents 17.

According to the embodiment, the projector can be provided which can prevent heated exhaust air that is expelled to the front of the projector from being heated to a high temperature locally even though the projector has a small housing.

Embodiment 1

Hereinafter, an embodiment of the invention will be described in detail based on the accompanying drawings. A projector according to an embodiment of the invention is formed into substantially a rectangular parallelepiped shape as is shown in FIG. 1 and has a lens cover 19 which covers a projection opening which is provided to a side of a front plate 12 which makes up a main body casing. A plurality of exhaust vents 17 are provided in the front plate 12, and the exhaust vents 17 includes louvers 20 which are provided not only to prevent light within a housing from leaking to the outside but also to prevent heated exhaust air from flowing to the front of the projection opening.

In addition, although the illustration is omitted in FIG. 1, a key/indicator unit is provided on an upper plate 11 which makes up the main body casing, and keys and indicators are provided in this key/indicator unit which include a power supply switch key and a power indicator which informs whether a power supply is on or off, a lamp switch key for lighting a lamp of a light source unit and a lamp indicator which indicates that the light source lamp is lighted, and an overheat indicator which informs that a light source unit is overheated.

Furthermore, an input/output connector portion where USB terminal ports, D-SUB terminal ports where image signals are inputted, S terminal ports, RCA terminal ports or the like are provided and an Ir receiving unit for receiving control signals from a power supply adapter plug and a remote controller are provided in a rear plate which is positioned on a rear side of the main body casing, which is not shown.

A plurality of air inlet vents 18 are provided in each of a right plate 14 which is a side plate of the main body casing, which is not shown in FIG. 1, and a left plate 15 which is a side plate shown in FIG. 1.

Figure 2:
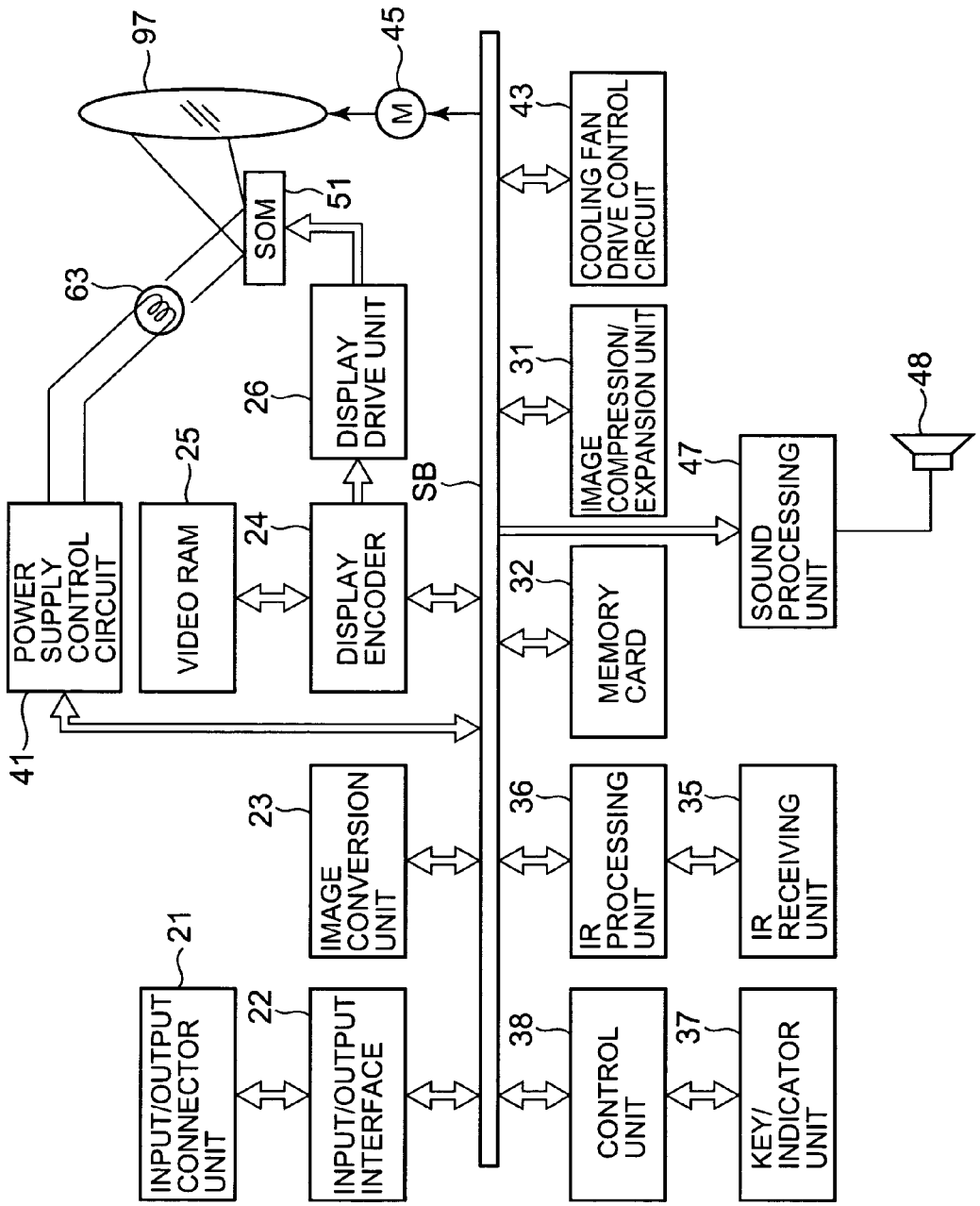
[FIG. 2] A control block diagram of the data projector according to the embodiment of the invention.

As is shown in FIG. 2, a control circuit of the projector 10 includes a control unit 38, an input/output interface 22, image conversion unit 23, a display encoder 24, a display drive unit 26 and the like, whereby image signals of various standards which are inputted from the input/output connector unit 21 are sent via the input/output interface 22 and a system bus (SB) to the image conversion unit 23 where the image signals are converted into image signals in a predetermined unified format which is suitable for display, and thereafter, the resulting image signals are sent to the display encoder 24.

In addition, the display encoder 24 has the image signals so sent thereto deployed and stored in a video RAM and produce a video signal from the contents of the video RAM for output to the display drive unit 26.

The display drive unit 26 into which video signals are inputted from the display encoder 24 is such as to drive a display device 51 which is made up of digital micromirror devices at an appropriate frame rate in response to the image signals sent thereto. Light from a light source unit 63 is made to be incident on the display device 51 via a light source side optical system, and a light image is formed by reflection light from the display device 51, the light image so formed being projected on to a screen, not shown, via a group of projection system lenses which makes up a projection side optical system for display on the screen. A group of movable lenses 97 of the group of projection system lenses is driven by a lens motor 45 for zooming adjustment and focusing adjustment.

In addition, an image compression/expansion unit 31 is such as to data compress a luminance signal and a color difference signal of an image signal through ADTC and Huffman coding processes so that the signals are sequentially written on to a memory card 32 which is a detachable recording medium and at the time of a regeneration mode to read out the image data recorded on the memory card 32, expand individual image data which make up a series of time-varying images frame by frame to be sent to the display encoder 24 via the image conversion unit 23 and enable the time-varying images to be displayed based on the image data stored on the memory card 32.

The control unit 38 is such as to govern the control of operations of individual circuits within the projector 10 and is made up of a CPU, a ROM in which various types of settings and operation programs are fixedly stored, a RAM which is used as a working memory and the like.

In addition, operation signals of the key/indicator unit 37 which is made up of main keys and indicators which are provided on the upper plate 11 of the main body casing are sent direct to the control unit 38, key operation signals from the remote controller are received by the Ir receiving unit 35, and code signals which are demodulated by an Ir processing unit 36 are sent to the control unit 38.

A sound processing unit 47 is connected to the control unit 38 via the system bus (SB) and includes a sound source circuit for a PCM sound source or the like, whereby when in a projection mode and the regeneration mode, sound data are converted into analog data, and then a speaker 48 is activated to radiate sound loudly based on the analog sound data.

The control unit 38 also controls a power supply control circuit 41 such that the lamp of the light source unit 63 is lighted by the power supply control circuit 41 when the lamp switch key is operated. Furthermore, the control unit 38 directs a cooling fan drive control circuit 43 to detect the temperature of the light source unit 63, for example, via a temperature sensor provided on the light source unit 63 so as to control the rotational speed of the cooling fan.

These ROM, RAM, IC and circuit devices are such as to be mounted on a control circuit board 103 which acts as a main control circuit board, and the power supply control circuit 41, which is on a power system side, is incorporated in a lamp power supply circuit block 101, so that the control circuit board 103 which acts as the main control circuit board of a control system is formed separately from a circuit board on which the lamp power supply circuit block 101 of the power system is mounted.

Figure 3:
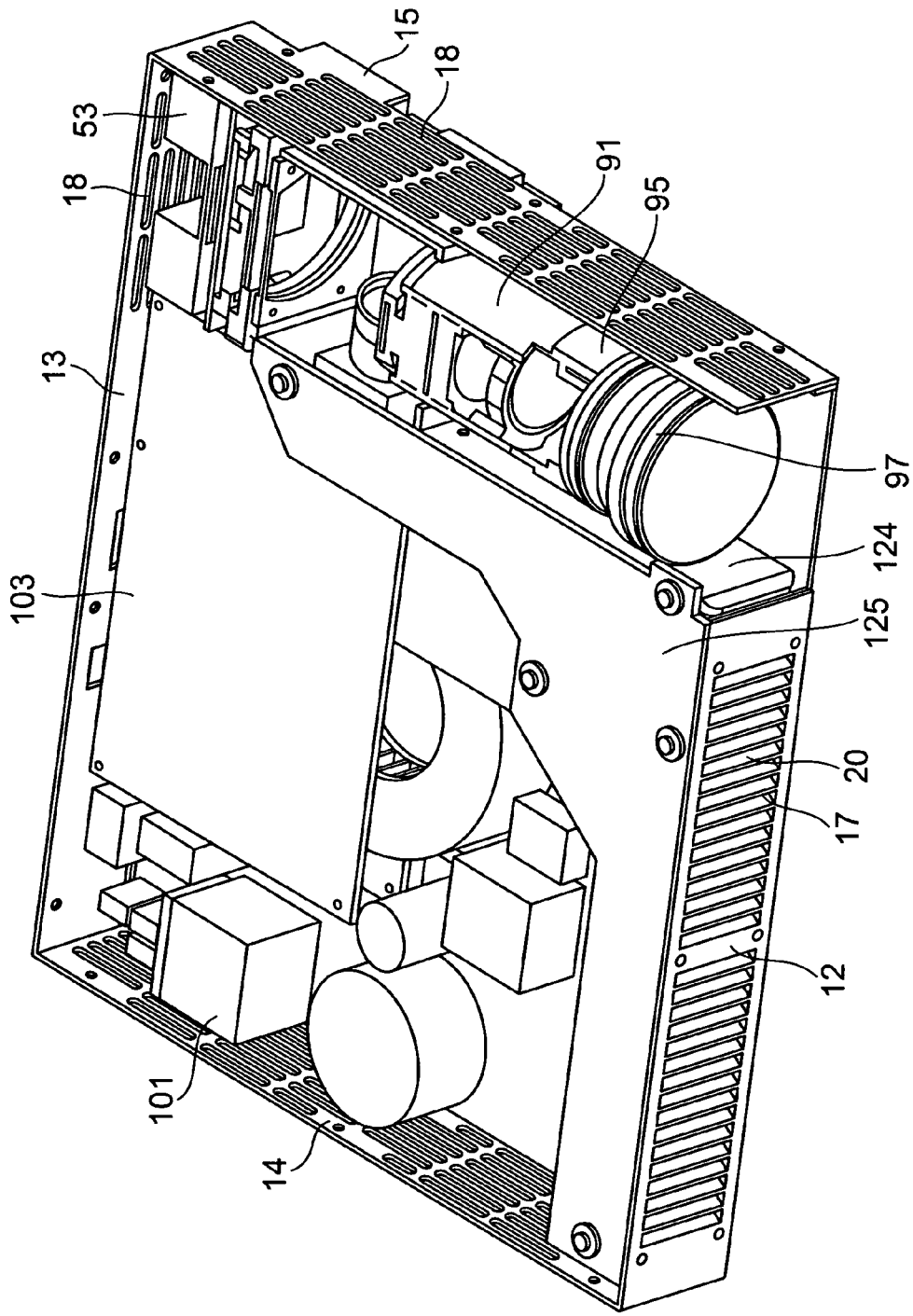
[FIG. 3] A perspective view showing the data projector according to the embodiment of the invention with an upper plate removed.
Figure 4:
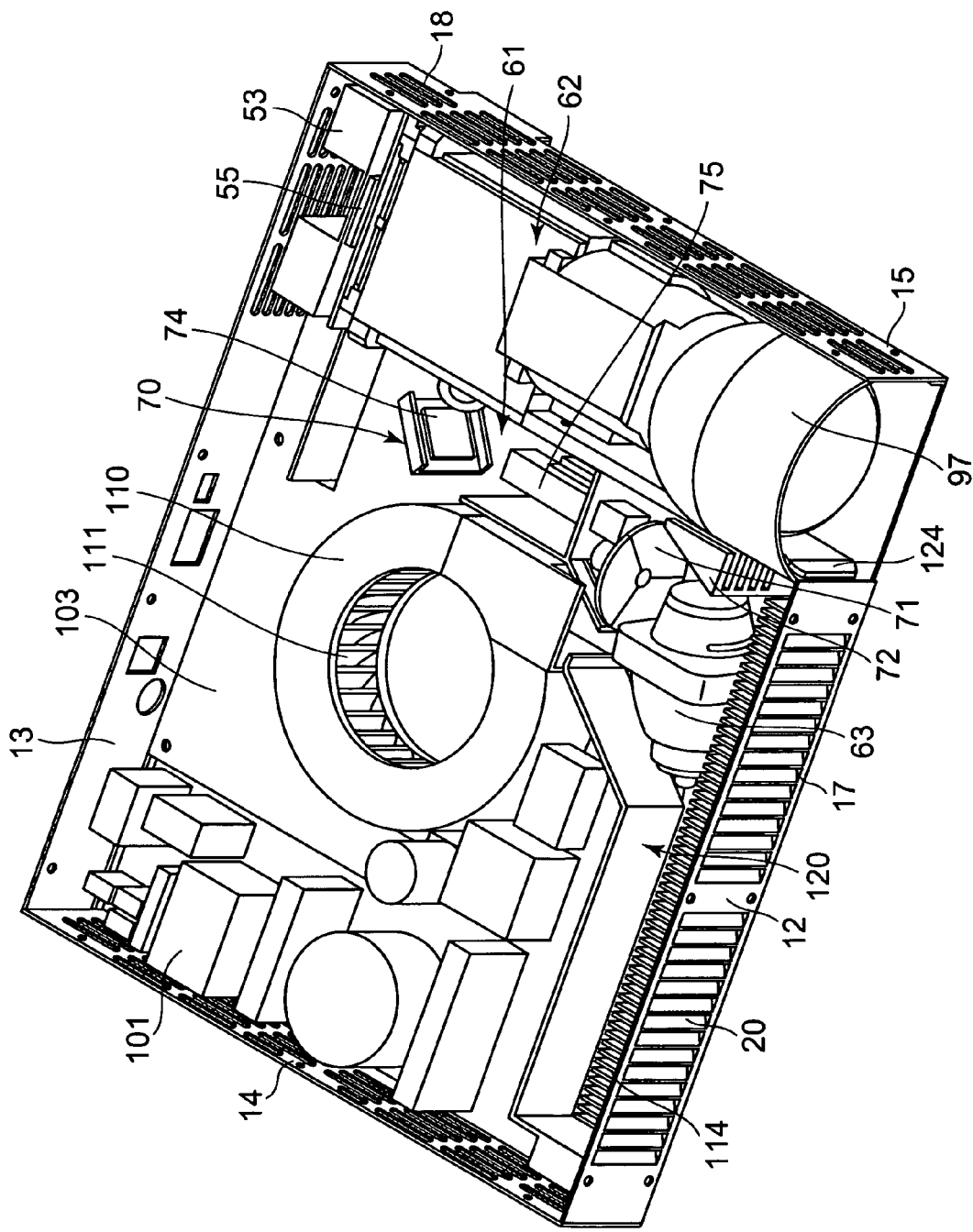
[FIG. 4] A perspective view showing the data projector according to the embodiment of the invention with the upper plate and a compartment cover removed.
Figure 5:
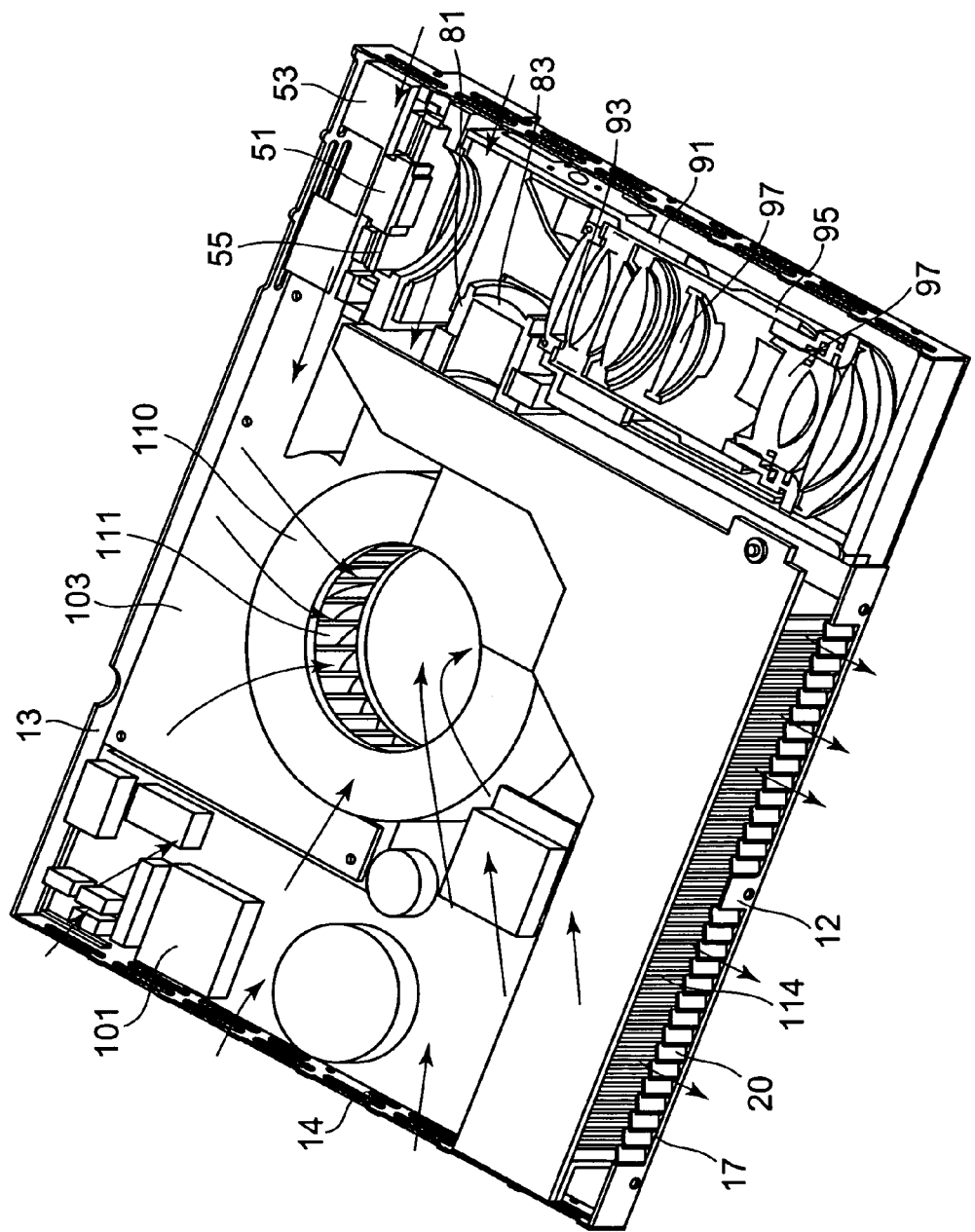
[FIG. 5] A perspective view showing flows of air in the data projector according to the embodiment of the invention.

As is shown in FIGS. 3 to 5, in an interior construction of the projector 10, the lamp power supply circuit block 101 which incorporates therein the power supply control circuit 41 is disposed in the vicinity of the right plate 14, the blower 110 of a sirocco fan type is disposed substantially at the center of a bottom plate 16 as a cooling fan, a light source compartment 120 is disposed in the vicinity of an air outlet port 113 of the blower 110, a projection side optical system 62 is disposed along the left plate 15, and a light source side optical system 61 is disposed on a rear side of the light source compartment 120 between the blower 110 and the projection side optical system 62.

Figure 6:
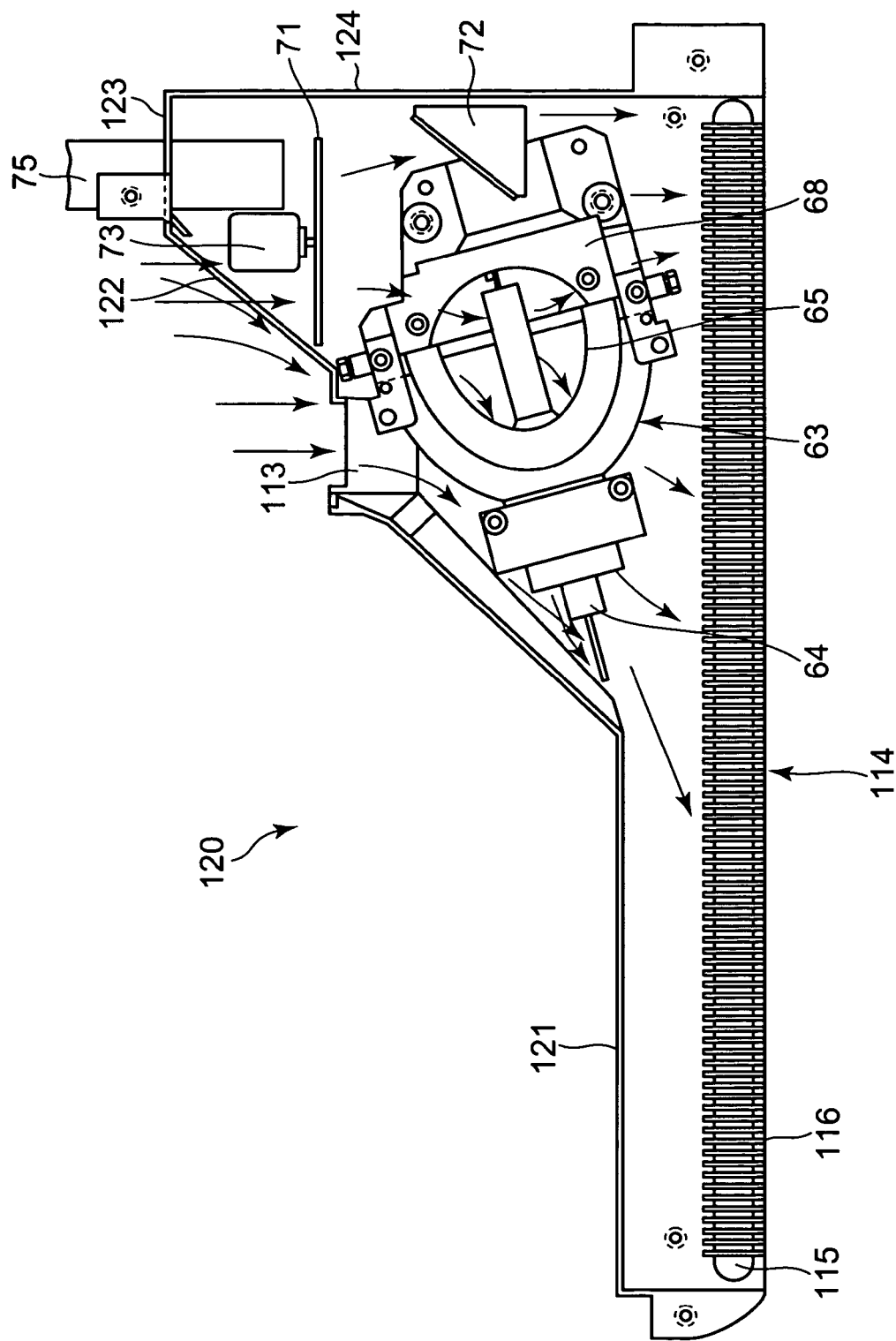
[FIG. 6] An explanatory diagram of a light source compartment of the data projector according to the embodiment of the invention.

As is shown in FIG. 6, this light source compartment 120 is configured such that the compartment is separated from other compartments within the projector by a first bulkhead 121, a second bulkhead 122, a third bulkhead 123 and a fourth bulkhead 124 which are each formed into a wall element, the front plate 12 is provided at the front thereof and the light source compartment 120, and a compartment cover 125 is placed to cover the light source compartment 120 from thereabove, as is shown in FIG. 5.

In addition, provided in an interior of the light source compartment 120 are the light source unit 63, a first reflecting mirror 72, a color wheel 71, a wheel motor 73, part of a light guiding rod 75 and an exhaust air temperature reducing unit 114, and the air outlet port 113 of the blower 110 is connected to the light source compartment 120 at a portion lying between the first bulkhead 121 and the second bulkhead 122 which are each formed into the wall element in such a manner that all the air discharged from the blower 110 is discharged into the light source compartment 120.

The first bulkhead 121 is a wall for defining a space between the circuit such as the lamp power supply circuit block 101 and various component members and the front plate 12. The first bulkhead 121 is provided in such a manner as to firstly extend an arbitrary length in an inclined fashion from the air outlet port 113 of the blower 110 towards substantially a vicinity of an intersection point between the front plate 12 and the right plate 14, then, extend parallel to the front plate 12 towards the right plate 14 as far as a vicinity of the right plate 14, and finally extend parallel to the right plate 14 from the vicinity of the right plate 14 to reach the front plate 12.

The shape of the first bulkhead 121 is formed into such a shape in order not only to allow air within the light source compartment 120 to be dispersed to the whole of the front plate 12 but also to reduce a wasteful space, whereby an appropriate space is provided between the lamp power supply circuit block 101 and the front plate 12 while evading the light source unit 63.

The second bulkhead 122 is a wall for directing part of air that is discharged from the air outlet port 113 of the blower 110 to the color wheel 71 and the wheel motor 73 and is provided in such a manner as to extend an arbitrary length in an inclined fashion from the air outlet port 113 of the blower 110 towards substantially an intersection point between the left plate 15 and a rear plate 13.

In addition, vents or slits are formed in the second bulkhead 122 so that air discharged from the air outlet port 113 of the blower 110 acting as the cooling fan is applied directly to the color wheel 71.

Furthermore, the third bulkhead 123 is a wall element for establishing a partition between the light source side optical system 61 and the light source unit 63 and extends from an end portion of the second bulkhead 122 to reach a vicinity of the projection side optical system 62 while allowing the light guiding rod 75 to penetrate therethrough in a portion along the length thereof.

In addition, the fourth bulkhead 124 is a wall element for establishing a partition between the projection side optical system 62 and the light source unit 63 and extends parallel to the left plate 15 from an end portion of the third bulkhead 123 to reach the front plate 12.

Thus, the light source compartment 120 is made into a hermetic construction relative to the interior of the housing of the projector 10 except for the air outlet port 113 of the blower 110 and is made to open to the outside of the housing via the exhaust vents 17.

Note that a heat insulating material is used for the first bulkhead 121, the second bulkhead 122, the third bulkhead 123, the fourth bulkhead 124 and the compartment cover 125, whereby heat within the light source compartment 120 is prevented from leaking to the outside thereof.

In addition, the exhaust air temperature reducing unit 114 is a heat conductive member. In this embodiment, the exhaust air temperature reducing unit 114 is made up of a heat pipe 115 having a capillary construction on an inner wall thereof and in an interior of which a working fluid such as pure water, perfluorocarbon or the like is hermetically sealed within a vacuum metallic pipe and fins 116 are used and is disposed between the exhaust vents 17 which are molded into the projector housing and the light source unit 63 which is a highly heated heat source. Note that the exhaust air temperature reducing unit 114 is disposed in such a manner as to extend over the whole surface of a portion of the front plate 12 where the exhaust vents 17 are formed.

The exhaust air temperature reducing unit 114 is constructed such that the heat pipe 115, which is a long rod-shaped heat conductive member, penetrates through central portions of the plurality of fins 116 which are each formed into a plate shape so as to connect the fins 116 together. As this occurs, the fins 116 are mounted on the heat pipe 115 in such a manner as to be oriented truly vertically relative to the heat pipe 115.

By mounting the fins 116 on the heat pipe 115 in this way, in a highly heated portion, heat absorbed by the fins 116 is let to escape to the heat pipe 115, whereas in a less heated portion, heat in the heat pipe 115 is dissipated to the outside via the fins 116, thereby making it possible to maintain a uniform or equalized temperature over the whole of the exhaust air temperature reducing unit 114. Since airs having different temperatures such as air that has been discharged from the cooling fan and has passed through the interior of or directly near the light source unit 63 which is a highly heated heat source and air that has passed through a space lying slightly away from the light source unit 63 exist in arbitrary different locations of the exhaust air temperature reducing unit 114, heat is absorbed at the fins 116 to which highly heated air is applied, whereas heat is dissipated at the fins 116 to which less heated air is applied. Note that the heat pipe 115 and the fins 116 may be molded separately or integrally to obtain the same advantage.

As is shown in FIG. 4 or 6, an optical system of the projector 10 is made up of the light source unit 63 in which an extra-high voltage mercury lamp is provided as a discharge lamp 64 in an interior of a reflector 65 which is covered at a front thereof by an explosion-proof glass 68, the light source side optical system 61 which directs light emitted from the light source unit 63 to DMD's (digital micromirror devices) which make up the display device 51, the display device 51, and a group of lenses of the projection side optical system 62 which projects light that is reflected by the display device 51 to form an image on to a screen.

In addition, the light source side optical system 61 is made up of the first reflecting mirror 72 which reflects light emitted from the light source unit 63 to the color wheel 71, the color wheel 71 having color filters provided on a periphery thereof to divide light from the first reflecting mirror into red light, green light, and blue light and adapted to be driven by the wheel motor 73, the light guiding rod 75 for converting light that has transmitted through the filters into a light beam of a uniform intensity distribution, a second reflecting mirror 74 which changes the direction of light that has emitted from the light guiding rod 75 through 90 degrees, a group of light source side lenses 83 which is made up of a plurality of lenses which concentrate light reflected by the second reflecting mirror 74 on to the display device 51, and a light shining mirror 85 which shines light that has been transmitted through the group of light source side lenses 83 on to the display device 51 at a predetermined angle.

Note that the second reflecting mirror 74 is fixed to a compartment cover 127 with a mirror fixture 70.

While in this embodiment, the second reflecting mirror 74 is used to change the direction of light from the light guiding rod 75, the direction of the light may be changed by any means, and therefore, a prism may be combined with the light guiding rod 75 so as to obtain the same advantage.

Furthermore, while in this embodiment, part of the light guiding rod 75 and the color wheel 71 are disposed within the light source compartment 120, there may be a case where the light source compartment 120 is formed in such a manner that the color wheel 71 and the light guiding rod 75 are disposed outside of the light source compartment 120.

In addition, the projection side optical system 62 is made up of a group of fixed lenses 93 which is incorporated in a fixed lens barrel 91 and a group of movable lenses 97 which is incorporated in a movable lens barrel 95, which are formed into a variable focus lens having a zooming function, whereby the group of movable lenses 97 is moved by the lens motor 45 to enable a zooming adjustment and a focusing adjustment.

Additionally, air inlet vents 18 are provided in a portion of the rear plate 13 which lies to the rear of the display device 51, and a air flow passageway is defined by the rear plate 13 and a display device mounting plate 55 so as to cause air sucked in from the air inlet vents 18 provided in the rear plate 13 and the air inlet vents 18 provided in a rear portion of the left plate 115 to flow in a direction towards the blower 110 along the rear plate 13.

A display device heat dissipation plate 53 is disposed to the rear of the display device mounting plate 55, and the control circuit board 103 is made up of two control circuit boards, whereby air flowing along the control circuit board 103 is made to be sucked into suction ports 111 of the blower 110 between the two circuit boards 103, or above or below of the two control circuit boards 103.

Consequently, when the blower 110 is rotated, the blower 110 which is made to act as the cooling fan sucks in air lying on the periphery thereof, and by sucking in air lying on the periphery of the blower 110 within in the interior of the projector 10, outside air is sucked into the interior of the projector 10 from the large number of air inlet vents 18 provided in the main body casing of the projector.

Then, part of outside air that is sucked in from the air inlet vents 18 in the rear portion of the left plate 15 and the air inlet vents 18 provided in the rear plate 13 flows through the air flow passageway between the rear plate 13 and the display device mounting plate 55 in such a manner as to cool the display device heat dissipating plate 53, passes along the control circuit boards 103 to flow over an upper surface and a lower surface of each of the control circuit boards 103 and through a space defined between the two control circuit boards 103 and is eventually sucked into the suction ports 111 of the blower 110.

In addition, outside air that is sucked in from the other air inlet vents 18 in the left plate 15 cools the projection side optical system 62, the group of light source side lenses 83 of the light source side optical system, the second reflecting mirror 74 and the portion of the light guiding rod 75 which is exposed from the light source compartment 120 and is then sucked into the suction ports 111 of the blower 110.

Part of outside air that is sucked into the interior of the projector 10 from the air inlet vents 18 in the right plate 14 is made to pass through the periphery of the lamp power supply circuit block 101 to reach the control circuit board 103 and continue to flow along the control circuit board 103 to be eventually sucked into the suction ports 111 of the blower 110. In addition, the remaining portion of the outside air so sucked in is made to flow along the first bulkhead 121 to be eventually sucked into the suction ports 111 of the blower 110.

Furthermore, part of air discharged from the blower 110 so as to be blown into the light source compartment 120 flows through the air vents in the second bulkhead 122 to continue to flow along the color wheel 71, while most of the air so blown into the light source compartment 120 flows on the periphery of the light source unit 63, and part of the air that so flows on the periphery of the light source unit 63 flows, as is shown in FIGS. 5 and 6, into an opening formed in the reflector 65 in such a manner as to pass through an interior thereof so as to cool the light source unit 63 and the color wheel 71.

Then, heated air that results from the cooling of the light source unit 63 and the color wheel 71 is led to the first bulkhead 121 to flow into the exhaust air temperature reducing unit 114 that is made up of the heat pipe 15 and the fins 116. Here, highly heated air that results immediately from the cooling of the light source unit 63 and air whose temperature is lowered through dissipation of heat to the surroundings while it moves away from the light source unit 63 after having cooled the unit or less heated air which has flowed while avoiding the light source unit 63 are applied to both ends of the exhaust air temperature reducing unit 114 that is made up of the heat pipe 115 and the fins 116, respectively, whereby the temperature of the whole air so exhausted is reduced and equalized and is then expelled to the outside from the exhaust vents 17 in the front plate 12. As this occurs, since the fourth bulkhead 124 exists, there is caused no case where highly heated air flows to the projection side optical system 62.

Thus, although there occurs the difference in temperature in the highly heated air that results from the cooling of the light source unit 63 due to the air that has passed through the interior of the reflector 65, the air that has passed through so near the light source unit 63 as to hit the light source unit 63 and the air that has passed through the position lying away from the light source unit 63, the temperature of the whole of the exhaust air is equalized by the heat pipe 115 and the fins 116 which make up the exhaust air temperature reducing unit 114, whereby even though the light source unit 63 is disposed near the front plate 12 in which the exhaust vents 17 are formed, locally heated air can be prevented from being expelled to the outside.

In addition, the louvers 20 which are provided in the exhaust vents 17 in the front plate 12 can be prevented from being heated to a high temperature, and since the fins 116 are molded to erect vertically relative to the heat pipe 115, the expelling resistance of air from the light source unit 63 is reduced so as to expel air inside the light source compartment 120 to the outside efficiently, thereby making it possible to cool the light source unit 63 efficiently.

Furthermore, since the light source compartment 120 is covered with the front plate 12 at the front thereof which is opened to a width which is close to the overall width of the front plate 12 except for the projection opening so that air within the light source compartment 120 is expelled to the outside of the projector 10 through the exhaust vents 17 provided in the front plate 12, even though air is discharged in a rapid and plentiful stream from the blower 110, air can be expelled to the outside moderately from the exhaust vents 17 which are formed over a wide range of the front plate 12, so that the air can be exhausted from the front of the projector 10 in a moderate fashion as an exhaust air whose temperature has been decreased to an equalized temperature as a whole while cooling the light source unit 63 with a large quantity of cooling air.

Note that the cooling fan is not limited to the blower 110 of the sirocco fan type.

In addition, the fins 116 used in the exhaust air temperature reducing unit 114 are not limited to those which are molded to erect vertically relative to the heat pipe 115 but may be formed into other constructions.

Figure 7:
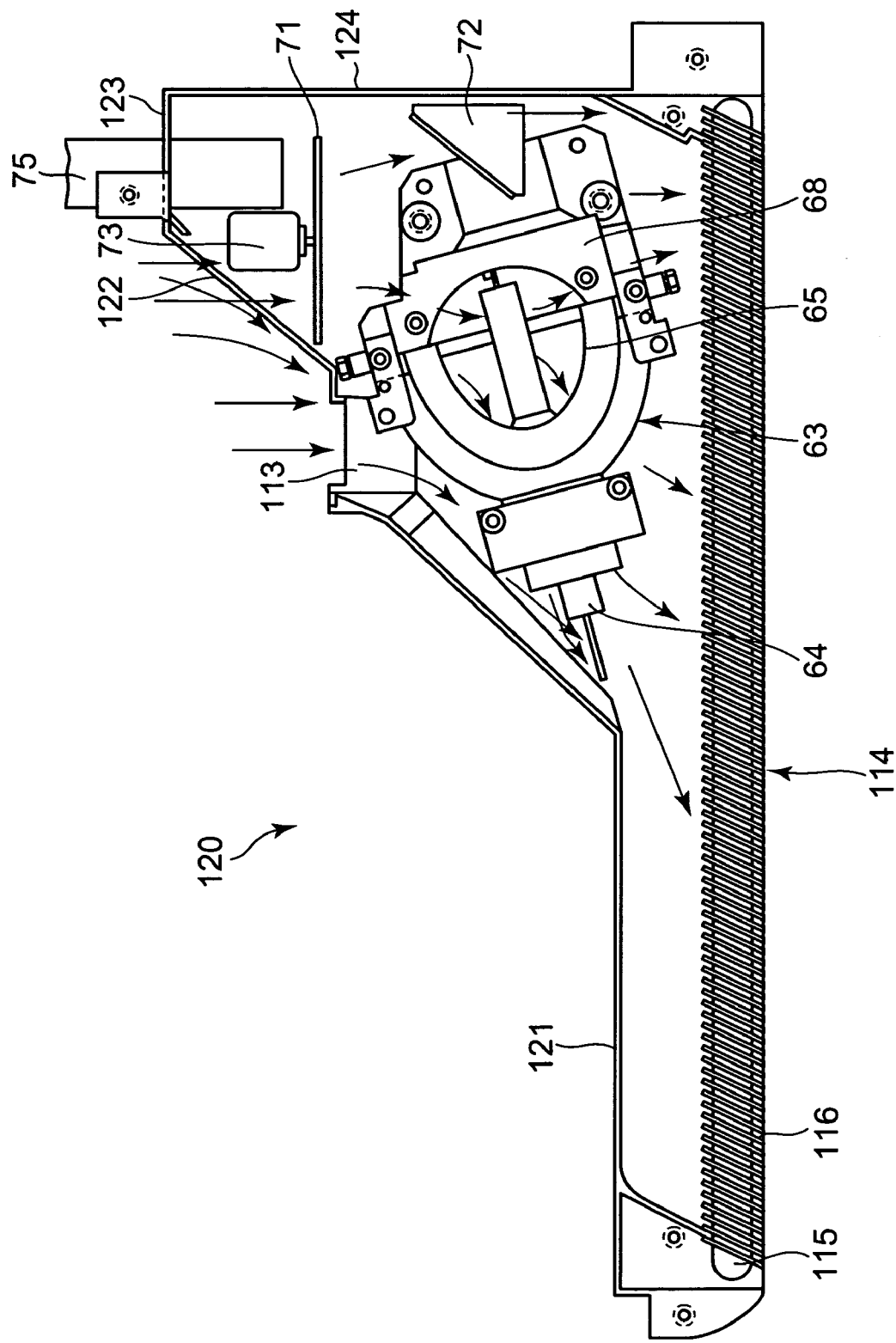
[FIG. 7] An explanatory diagram of the light source compartment of the data projector according to the embodiment of the invention.

For example, as is shown in FIG. 7, there may occur a case where fins 116 are rotated slightly to the fourth bulkhead 124 side so as to be fixed in such a state as to be inclined relative to the heat pipe 115.

By adopting this configuration, exhaust air from the light source compartment 120 can be prevented from flowing in a direction towards the front of the projection opening which is the direction in which a projected image is formed by the projection side optical system 62.

Consequently, the wobbling of a projected image that is generated by a flow of highly heated air into light shone on to the screen from the projection side optical system 62 can be prevented efficiently. In addition, due to the fins 116 being angled, the air resistance is increased, whereby the temperature of air that is to be expelled therefrom can be reduced more effectively.

Figure 8:
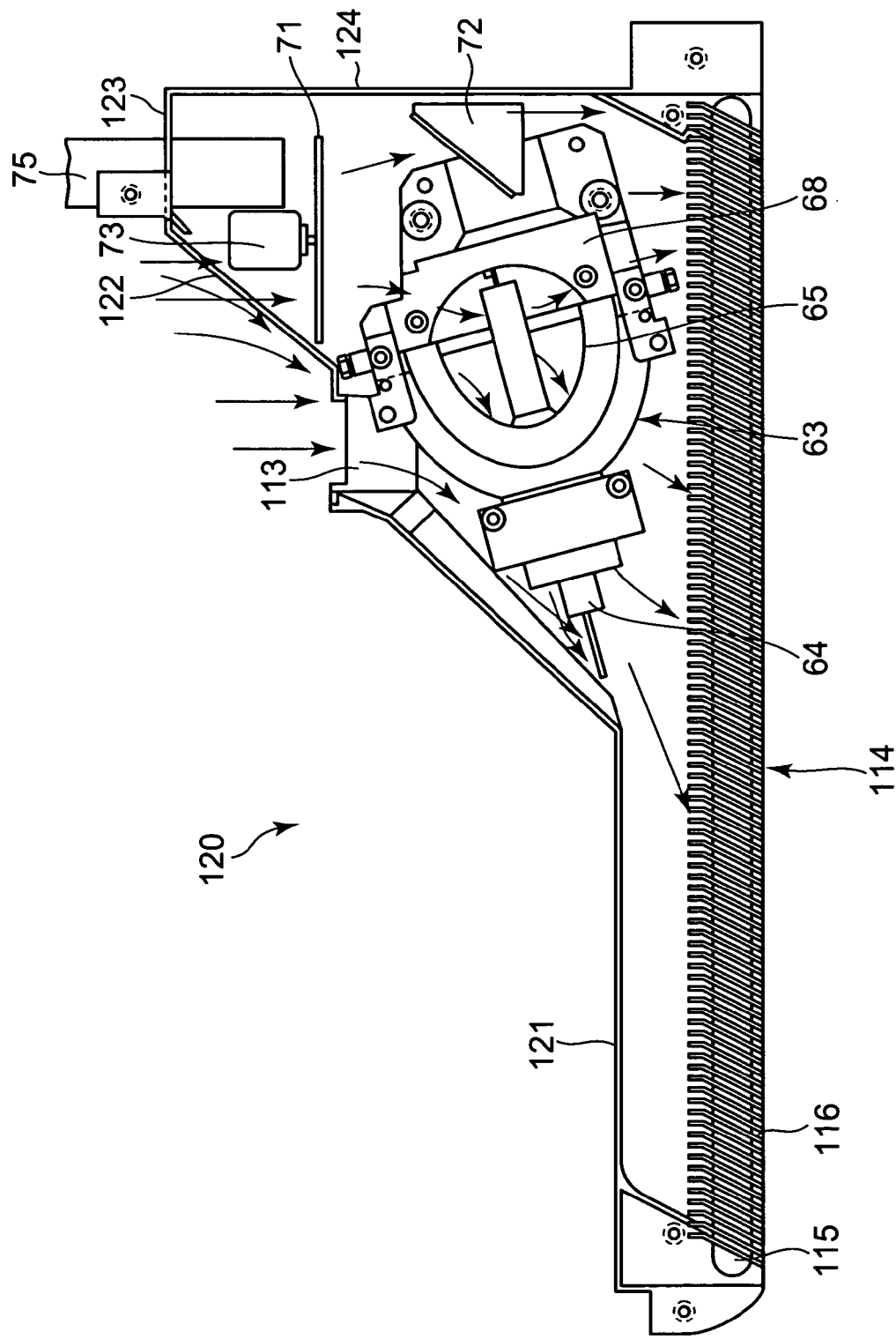
[FIG. 8] An explanatory diagram of the light source compartment of the data projector according to the embodiment of the invention.
Figure 9:
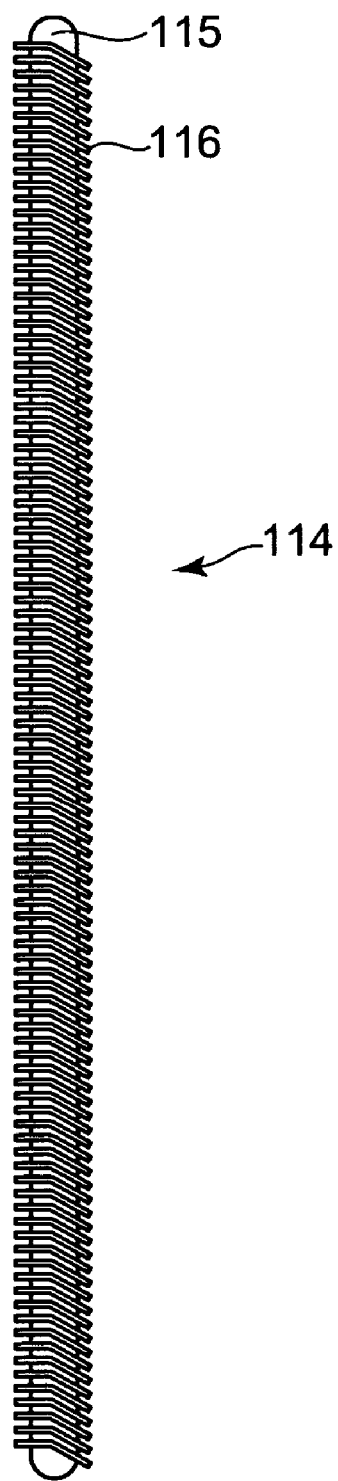
[FIG. 9] A schematic diagram of an outside air temperature reducing unit of the data projector according to the embodiment of the invention.
Figure 10:
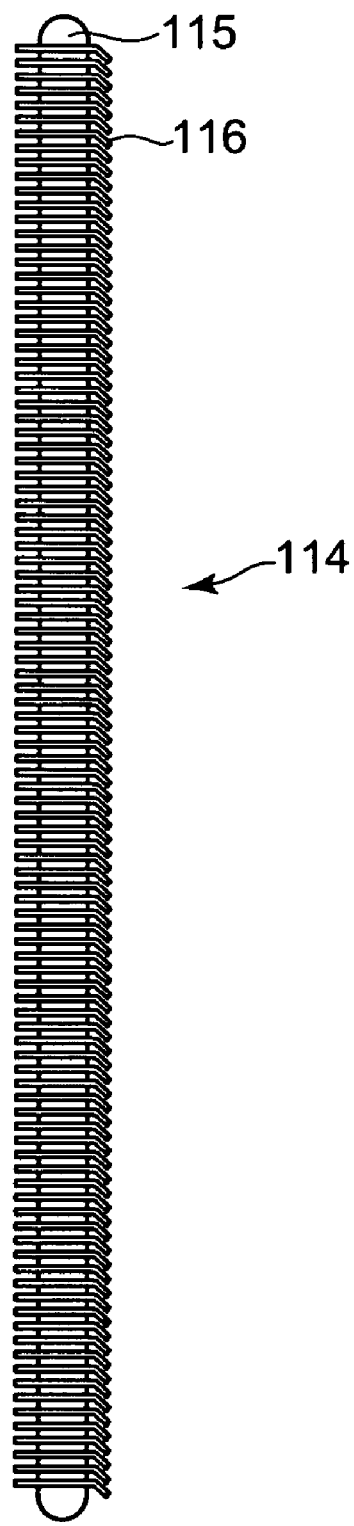
[FIG. 10] A schematic diagram of an outside air temperature reducing unit of the data projector according to the embodiment of the invention.

Furthermore, as is shown in FIGS. 8 to 10, there may occur a case where plate-shaped fins 116 are worked to be bent, and the fins 116 which are so bent are mounted on the heat pipe 115. By adopting this configuration, highly heated air can be prevented from flowing in the direction towards the front of the projection opening which is the direction in which a projected image is formed by the projection side optical system 62, whereby the wobbling of a projected image that is generated by a flow of highly heated air into light shone on to the screen can be prevented efficiently. In addition, due to the fins 116 being angled, the air resistance is increased, whereby the temperature of air that is to be expelled therefrom can be reduced more effectively.

Furthermore, since the fins 116 are bent midway along the length thereof, light is prevented from leaking to the outside, and hence, the louvers 20 do not have to be mounted in the exhaust vents 17 in the front plate 12, whereby the expelling resistance at the front plate 12 can be reduced so as to improve the exhaust efficiency.

Note that there is imposed no limitation on the location where the fin is bent, and there are a case where a fin 116 is made such that a portion thereof which intersects the heat pipe 15 at right angles is reduced, a case where a fin 116 is made such that a portion thereof which intersects the heat pipe 15 at right angles and a portion thereof which is inclined relative to the heat pipe 115 are made to be equal to each other, and a case where a fin 116 is made such that a portion thereof which is inclined relative to the heat pipe 115 is increased.

In addition, the invention is not limited to the embodiment that has been described heretofore but can be modified and improved freely without departing from the spirit and scope of the invention. Additionally, the exhaust air temperature reducing construction of the invention can be applied not only to the projector but also to electric appliances such as a rear production TV, a personal computer and the like.

Namely, by providing an electric appliance including a housing which has a primary heat source, a secondary heat source having a smaller heat value than that of the primary heat source and a cooling fan for cooling the primary heat source and the secondary heat source in such a manner that the primary heat source is cooled with air discharged from the cooling fan and cooling the secondary heat source is cooled with air sucked into the cooling fan, an exhaust air temperature reducing unit for reducing the temperature of highly heated air that results form the cooling of the primary heat source by the cooling fan, and exhaust vents for expelling air that has passed through the exhaust air temperature reducing unit to the outside, the same advantage can be obtained on another electric appliance.

What is claimed is:

1. A projector comprising:
   a light source unit;
   a light source side optical system;
   a display device for producing a projection image;
   a projection side optical system for projecting the projection image;
   a single cooling fan for cooling the light source unit;
   an exhaust air temperature reducing unit for reducing a temperature of highly heated air which is produced as a result of the cooling of the light source unit by the cooling fan;
   a vent hole for expelling exhaust air which has passed through the exhaust air temperature reducing unit to the outside; and
   a bulkhead which separates the light source unit from other compartments within the projector and which guides air flows having different temperatures which have been caused to cool the light source unit by the single cooling fan such that the air flows are applied to respective different locations of the exhaust air temperature reducing unit;

wherein the exhaust air temperature reducing unit absorbs and dissipates heat of the highly heated air at the different locations to which the air flows having the different temperatures guided by the bulkhead are applied, to equalize the temperatures of the air flows, such that the temperature of the highly heated air is reduced.

2. A projector as set forth in claim 1, wherein the exhaust air temperature reducing unit is disposed between the exhaust vent and the light source unit.

3. A projector as set forth in claim 1, further comprising a light source compartment for accommodating therein the light source unit and the exhaust air temperature reducing unit.

4. A projector as set forth in claim 3, wherein the cooling fan is provided outside of the light source compartment, and an air outlet port of the cooling fan is connected to a wall element of the light source compartment.

5. A projector as set forth in claim 4, wherein the light source compartment is formed to have a hermetic construction relative to a housing of the projector at locations other than the air outlet port of the cooling fan.

6. A projector as set forth in claim 1, wherein the exhaust air temperature reducing unit includes a heat conductive member and a plurality of plate-shaped fins, the heat conductive member being equally brought into contact with plate surfaces of the plurality of plate-shaped fins.

7. A projector as set forth in claim 6, wherein the heat conductive member comprises a heat pipe.

8. A projector as set forth in claim 1, wherein the exhaust air temperature reducing unit is disposed over an overall surface of the exhaust vent.

9. A projector as set forth in claim 7, wherein the fins are mounted vertically with respect to a longitudinal direction of the heat pipe.

10. A projector as set forth in claim 7, wherein the fins are mounted on the heat pipe in an inclined fashion relative thereto so as to prevent discharge air from being directed in a direction in which a projected image is formed by the projection side optical system.

11. A projector as set forth in claim 6, wherein plate surfaces of the fins are bent so as to prevent discharge air from being directed in a direction in which a projected image is formed by the projection side optical system.

* * * * *